Sept. 6, 1932.  R. BRAUNAGEL  1,875,844
ELECTRIC HEATING DEVICE
Filed Aug. 12, 1930   2 Sheets-Sheet 2

INVENTOR
ROBERT BRAUNAGEL
BY
ATTORNEYS

Patented Sept. 6, 1932

1,875,844

UNITED STATES PATENT OFFICE

ROBERT BRAUNAGEL, OF VICTORIA, BRITISH COLUMBIA, CANADA

ELECTRIC HEATING DEVICE

Application filed August 12, 1930. Serial No. 474,831.

My invention relates to improvements in electric heating devices which are particularly adapted for use in electric ranges and the like. The objects of the invention are to provide means whereby the temperature of a hot plate will be maintained above room temperature for an extended period after switching off the hot plate; to provide for surplus heat from said hot plate to be utilized for heating an air circulating chamber and water coils therein, and to provide means, other than the hot plate heating means, for maintaining said hot plate temperature and for heating the chamber and the water coils so that in locations where two current rates are in force, one being relatively high for daytime current when peak conditions apply at the generating plant and the other being low for night current when it is desired by reducing the rate to induce the use of current to equalize consumption, a decided economy of fuel may be obtained.

The invention consists essentially of a chamber having one or more hot plates in its top wall, and electrically heated hot water coils therein and heat transfer means between the two, as will be more fully described in the following specification and shown in the accompanying drawings, in which:—

In the drawings like characters of reference indicate corresponding parts in each figure.

Figure 1:
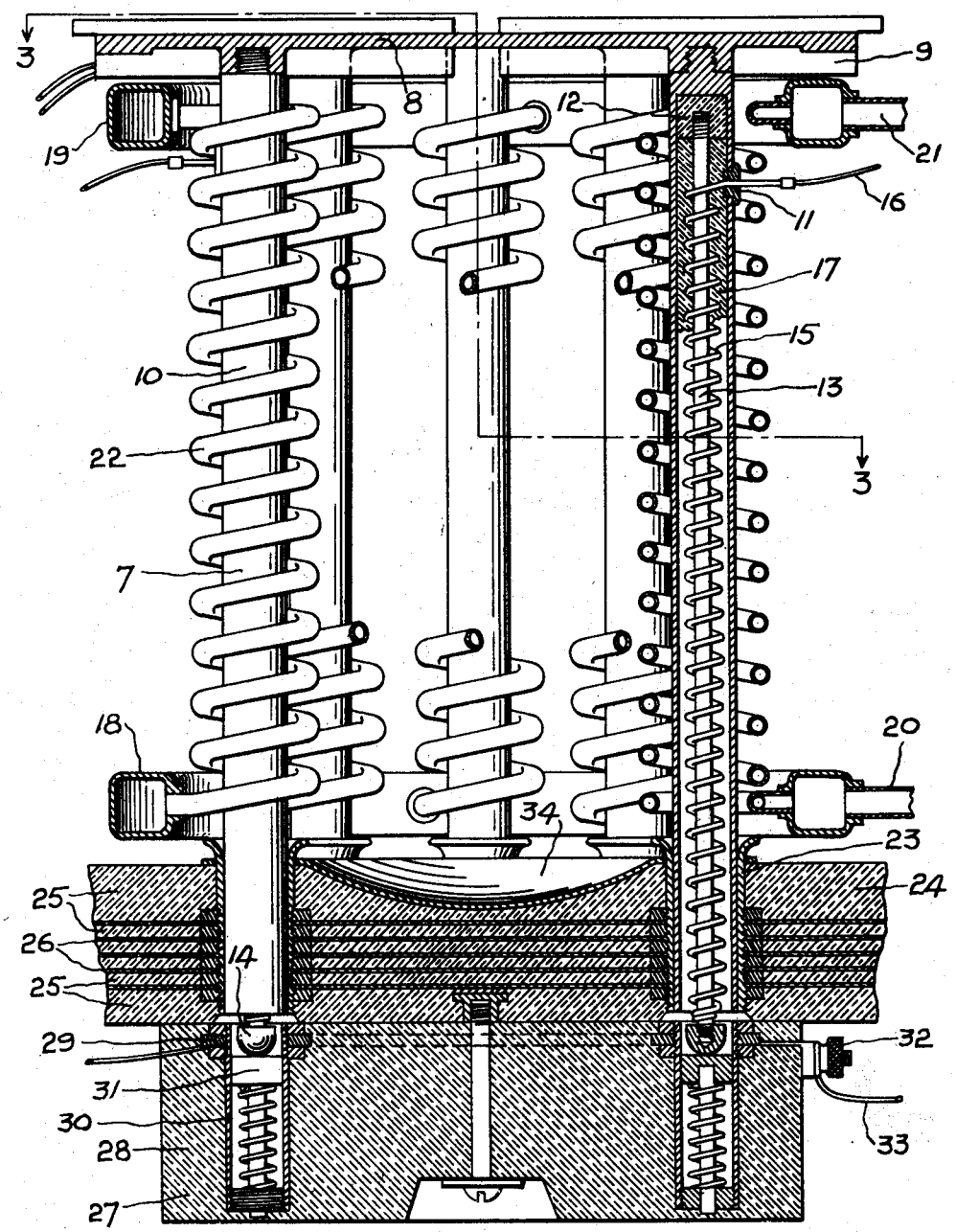
Fig. 1 is a vertical sectional view of a hot plate and hot water coil unit of the invention.
Figure 3:
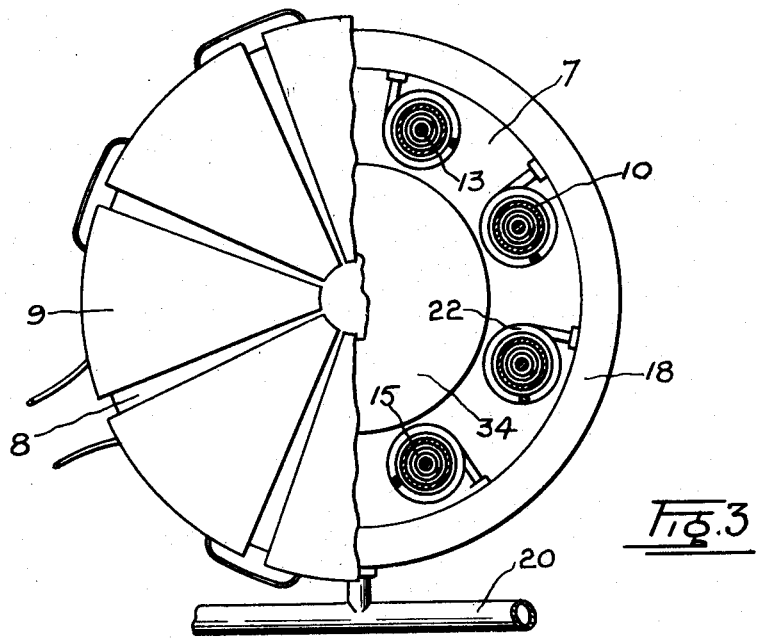
Fig. 3 is a plan view and horizontal section taken on the line 3—3 of Figure 1.
Figure 2:
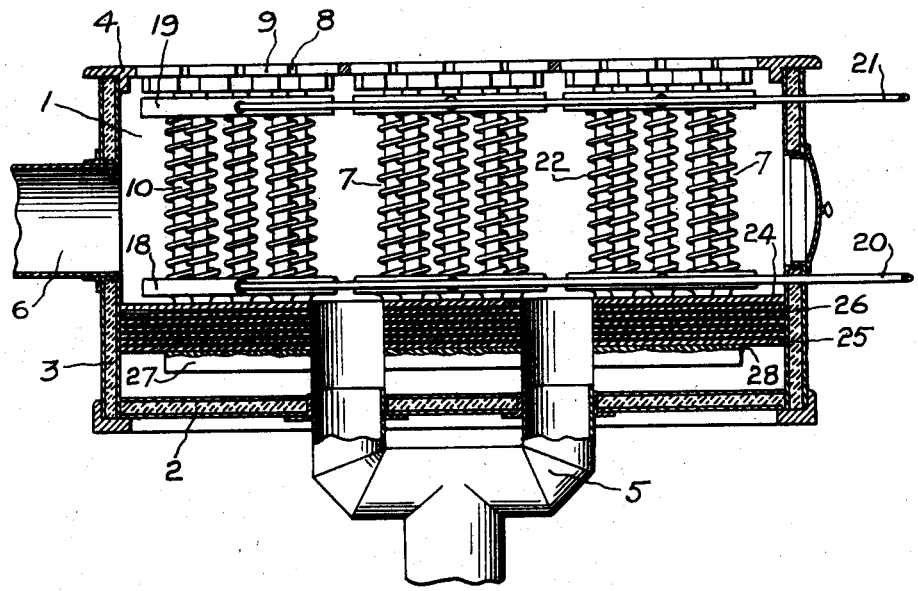
Fig. 2 is a sectional view of an air heating chamber containing a plurality of units.

The numeral 1 indicates a chamber having a removable bottom wall 2, side walls 3 and a top wall 4, all of which are suitably insulated to conserve heat generated within the chamber. The chamber is preferably fitted with air inlet pipes 5 and an air outlet pipe 6, so that air heated by the units may be transferred to any desired point of use. Fitted in the chamber is a plurality of heating units generally indicated by the numeral 7 which consist of a hot plate 8 having one or more heating elements 9 therein, adapted for connection to a suitable circuit. Extending downwardly from the hot plate is a plurality of copper tubes 10 which are open at their lower extremities and are provided adjacent their upper ends with insulated bushings 11. Fitted at the upper end of each tube 10 is a block of insulating material 12 from which a copper rod 13 extends downwardly to a point below the bottom of the tube where it is fitted with a contact button 14. Surrounding each rod 13 and connected thereto at its lower end is a resistance element 15 which passes outwards through the bushing 11 for connecting a circuit lead 16.

The interior of the tubes 10 is packed with suitable insulating material 17 which is so placed as to insulate the wrappings of the resistance element from the rod 13. Inlet and an outlet manifolds 18 and 19 respectively surround each series of tubes 10, which are connected by inlet and outlet pipes 20 and 21 respectively to a hot water system and are connected together by vertical tubes 22 spirally wound around each of the tubes 10. The lower end of the tubes 10 of each unit project downwardly into closely fitting sleeves 23 embedded in a composite slab 24 of insulating material consisting of compressed asbestos laminations 25 separated with bright sheet metal interlayers 26, which interlayers are in intimate contact with the sleeves 23.

Secured to the underside of the slab 24 below each unit is a connector 27 comprising a block of insulating material 28 enclosing a metallic ring 29 which supports a plurality of sockets 30, equal in number to the number of tubes 10 in a unit. These sockets each contain a spring pressed plunger 31 which is adapted to form a contact with the contact button 14 of the rods 13. The ring 29 is connected to a terminal 32 to which a circuit lead 33 is adapted to be connected. A reflector 34 is embedded in the slab 24 concentrically with each hot plate 8, for the purpose of reflecting the heat generated by the element 9 and 15 back into the space between the circumferentially disposed tubes 10.

Having thus described the several parts of my invention I will now briefly explain its function.

When using the device for cooking, a utensil is placed upon the hot plate 8 and the current to its element 9 is switched on. As heat is generated in the hot plate some of it is conducted downwards through the tubes 10 in the chamber 1, where it may be transmitted in part to the hot water pipes 22 and the water therein, and to the air within the chamber. Obviously when the contents in the utensil are at a relatively low temperature, such material will absorb the major portion of heat from the elements, and no appreciable heat will pass downwards into the tubes 10 until the contents of the utensil are materially increased in temperature also.

The heat absorbed by the tubes 10 and associated parts, if not otherwise dissipated, will remain in reserve after the elements 9 have been switched off and will serve to maintain a substantial heat for a lengthy period in the hot plate, so that if the hot plate is again brought into use, a quick return to maximum heat will result therein. When the circuits which include the resistance elements 15 are closed the heat generated therein will heat the tubes 10 and in part be conducted to the hot plate 8 to maintain it at a moderate temperature and at the same time will impart heat to the water tubes 22 and the air within the chamber 1 for use in heating the building in which the chamber is installed.

What I claim as my invention is:—

1. An electric heating device comprising a chamber having a top wall, a hot plate mounted in said top wall for heating utensils, a vertical tubular member integral with the hot plate, a resistance element in the hot plate, a further resistance element in the tubular member and a hot water heating tube within the zone of heat of the tubular member.

2. An electric heating device having a top wall embodying a hot plate, a plurality of members depending concentrically from said hot plate into the chamber, each of said members being provided with a heating element separate from the hot plate, a hot water coil surrounding each element and an intake and an outlet manifold surrounding the elements and communicating with each of the coils.

3. An electric heating device comprising a chamber having an apertured top wall, a hot plate totally closing the aperture and adapted for heating a utensil placed thereon, said hot plate having metallic members extending downwardly into the chamber for conducting heat from the hot plate into the chamber to heat it.

4. An electric heating device comprising a chamber having an apertured top wall, a hot plate totally closing the aperture and adapted for heating a utensil placed thereon, said hot plate having metallic members extending downwardly into the chamber for conducting heat from the hot plate, and means surrounding the members for absorbing the conducted heat.

5. An electric heating device comprising a chamber having an apertured top wall, a hot plate totally closing the aperture having a resistance element, a metallic member extending downwardly into the chamber for conducting heat from the hot plate into the chamber, and a separate resistance element for the downwardly extending member.

Dated at Vancouver, B. C., this 14th day of July, 1930.

ROBERT BRAUNAGEL.